(12) United States Patent
Degarate (10) Patent No.: US 11,014,624 B2
(45) Date of Patent: May 25, 2021

(54) INTEGRATED HAND GUARD SYSTEM

(71) Applicant: Paul Degarate, Niwot, CO (US)

(72) Inventor: Paul Degarate, Niwot, CO (US)

( * ) Notice: Subject to any disclaimer, the term of this patent is extended or adjusted under 35 U.S.C. 154(b) by 0 days.

(21) Appl. No.: 14/696,473

(22) Filed: Apr. 26, 2015

(65) Prior Publication Data

US 2016/0311490 A1 Oct. 27, 2016

(51) Int. Cl.
*B62J 23/00* (2006.01)
*B62K 21/26* (2006.01)
*B62K 21/12* (2006.01)
*B62J 29/00* (2006.01)

(52) U.S. Cl.
CPC .............. *B62J 23/00* (2013.01); *B62J 29/00* (2013.01); *B62K 21/125* (2013.01); *B62K 21/26* (2013.01)

(58) Field of Classification Search
CPC ............ B62K 21/125; B62J 11/00; B62J 6/00
See application file for complete search history.

(56) References Cited

U.S. PATENT DOCUMENTS

| | | | | |
|---|---|---|---|---|
| 8,820,191 B2* | 9/2014 | Laivins | .................... | B62J 23/00 74/551.8 |
| 9,016,167 B2* | 4/2015 | Degarate | .................. | B62J 23/00 280/288.4 |
| 2010/0180716 A1* | 7/2010 | Brumana | ................. | B62J 23/00 74/551.8 |
| 2012/0279348 A1* | 11/2012 | Wood | ....................... | B62J 23/00 74/551.8 |

FOREIGN PATENT DOCUMENTS

JP 10297568 A * 11/1998

* cited by examiner

*Primary Examiner* — Vicky A Johnson (57) ABSTRACT

Integrated Hand Guard System for vehicles utilizing handlebars for steering, consisting of; hand/controls guards (guards), integral/stowable mirror assembly, damper mount, display guard and integral electrical accessory mounting provisions.

5 Claims, 8 Drawing Sheets

INTEGRATED HAND GUARD SYSTEM

RELATED APPLICATION

This is a continuation in part application of non provisional patent application Ser. No. 11/957,105 filed on 14 Dec. 2007, titled "Integrated hand and controls protection system", and fully incorporates its specification and drawings by reference, and made a part of the present disclosure.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of the Invention

The invention relates to hands/controls protection and accessories mounting on vehicles utilizing handlebars for steering systems.

2. The Description of Related Art

There are many upgrade options available to tailor/improve the utility of vehicles, particularly off-road/dual sport motorcycles. Popular upgrades include, but are not limited to; hand guards and fairings, lighting and lighting controls, mirrors and mounts, auxiliary switch mounts, information displays, steering dampers, and handlebar stiffeners. Currently these utility upgrades are principally stand-alone units that generally mount directly to the handlebars with their unique clamping devices. The stand-alone systems are competing with scarce mounting surface available on the vehicle handlebars, which limits potential upgrades. In practice, many operators adjust handlebar clamps to allow mounted controls and/or handlebars to rotate in event of impact rather than bend or fracture. Existing aluminum hand guard designs incorporate simple bars with a nominal cross section, limited impact coverage and rigid mounting provisions. Existing rear view mirror designs are cumbersome, prone to damage and provide degraded reflected images particularly in high vibration environments. Other mirror implementations are fixed non-adjustably to a fairing or provide a simple single rotational degree of freedom, preventing full line of sight adjustment.

U.S. Pat. No. 3,832,912 (September 1974, Edwards) presents a simple hand guard with inboard attachment by means of a dedicated clamp on the handlebar.

U.S. Pat. No. 4,141,567 (February 1979, Scott) presents protective fairings cantilevered off various configurations of controls clamped to handlebars.

U.S. Pat. No. 4,438,661 (March 1984, Cullen) presents simple formed guard with inboard attachment by means of a dedicated clamp on the handlebar.

Design U.S. Pat. No. 319,992 (September 1991, Acerbis) presents fairings that are clamped to the handlebars.

U.S. Pat. No. 6,805,023 (October 2004, Greetis) presents replacement handlebars that integrate mountings and protect cabling for steering mounted controls.

Patent application US 2003/0177857 (March 2002, Chuang) presents a mirror folding into a bicycle grip.

Patent application US 2005/0237643 (April 2004, Wu) presents a mirror with a ball joint.

Patent application US 2004/0217243 (February 2004, Laivins) presents a universal clamp for inboard attachment of hand guards to the handlebars.

Patent application US 2005/0040621 (February 2005, Paris) presents a fixed position upper bar clamp guard attachment with integral damper mount.

BRIEF SUMMARY OF THE INVENTION

The invention, Integrated Hand Guard System, provides a system that integrates hand guards, mirrors and accessory mounting provisions into a multi-function unit that helps alleviate the clutter and allows improved functionality, reduced parts count and weight for vehicles with a handlebar, while greatly expanding the area of protection coverage. Shaping of an aluminum hand guard by increasing the nominal cross section to increase impact coverage for riders hands behind a large contoured teardrop area.

All other hand guards currently available provide only a nominal aluminum guard supplemented with a plastic fairing to increase coverage, but in the case of an impact in an area other then centered on the nominal aluminum guard such as a tree, rock or anything substantial, the plastic fairing of the currently available hand guards will easily yield and serious injuries have occurred. Why are currently available hand guards produced in this manner, because it is easier and less costly. It is easier to cut a simple extruded aluminum bar stock to length and bend it, and it is less costly to machine a pattern that nests efficiently to reduce the amount of material recycled and develop the tooling needed to form the complex 3 dimensional shape, but the results provide much less effective protection. Critical to note, a hand guard made of plastic or composite would also provide much less effective protection then aluminum or other high tensile metal.

To achieve a hand guard of larger than nominal cross section an aluminum blank must be produced with a pattern of variable cross section, this is typically done by machining, after the blank is cut, it is then formed. The aluminum hand guard of the Integrated Hand Guard System is formed into a slightly concave teardrop shape that allows for uniform clearance for the riders hands and controls. A distinction must be made between an aluminum hand guard of greater cross sectional width and an additional add-on plastic fairing that can yield with magnitudes less force, consideration must be given to the application of a moving handlebared vehicle impacting an object or the ground.

The Integrated Hand Guard System further improves riding comfort with a fitted plastic fairing. This supplemental plastic fairing provides excellent protection from elements such as rain, mud, bugs, etc.

The Integrated Hand Guard System utilizes a threaded insert for attaching the hand guard to the handlebar bar. The end user, using a supplied tap, cuts internal threads into the internal diameter of the end of the handlebars, then a supplied threaded insert with concentric internal and external threads is installed into the end of the handlebars. Thus creating one of the best mounting techniques available.

The Integrated Hand Guard System provides for an increased diameter of guard bar end. This enlarged bar end boss protects the entire end of a handlebar grip, but more importantly with most throttle tubes made of plastic and vulnerable to impact, the enlarged bar end boss provides critical protection. All other hand guards currently available provide only a horizontal nominal cross section bar that is not even as wide as the handlebar and easily allows the handlebar grip and throttle tube to be damaged in the event of a crash.

With an increased diameter of the enlarged bar end boss, many other features can then be obtained. A pocket on the inside of the bar end boss that can mate with the end of the handlebars when combined with a fastener to attach to the handlebar creates a shear resistant solution in the event of a crash. All other hand guards currently available do not have the material present to enable such a pocket. In an alternate embodiment, the final word on bar end attachment for hand guards is achieved with the increased diameter of the enlarged bar end boss, the Integrated Hand Guard System can eliminate the threaded insert altogether and use a bolt of the same size diameter of the tap used to cut the internal threads in the end of the handlebars. Thereby eliminating a weak point and creating a joint stronger than the hand guard. It is important to note that material is still a critical consideration, this strength can be achieved with an aluminum hand guard, not plastic or composite.

With the enlarged bar end boss it is then also possible to offset the hand guard tangent to the bar end boss to create an offset below the handlebars to allow improved mirror deployment.

In an alternate embodiment The Integrated Hand Guard System can provide for a boss for mounting front turn signals or auxiliary lighting by increasing the nominal cross section of the hand guard, thereby maintaining strength. It is important to note that some end users will drill holes in hand guards currently available, for mounting mirrors, lights, turn signals and such, further weakening the already nominal cross section of currently available guards, almost all available handguards on the market have a consistent thickness and cross section being defined as that thickness multiplied by the width at any given point along the handguard, the nominal cross section being defined as that thickness multiplied by a nominal width at any given point along the handguard. By varying the cross section of the handguard over nominal the attachment point for the mirror can be placed in an area where the strength will not compromised.

The Integrated Hand Guard System incorporates an integrated fully adjustable rear view mirror assembly that can be securely stowed and fully protected behind the large contoured teardrop shaped hand guard when not needed. The fully adjustable mirror is preferably attached to the hand guard.

Inboard attachment of the Integrated Hand Guard System is provided with at least one slotted aperture, which allows guard to be fastened to the swivel boss for handlebars of varying widths. The swivel boss attaches to a threaded aperture in the side face of the upper handlebar clamp, which allows for greater adjustment of guard position relative to handlebars upon installation.

Additionally, the swivel boss incorporates a hard stop, which allows limited energy attenuation in event of impact while still offering essential protection by limiting overall rotation. In severe impacts that can overcome the strength of this hard stop it is designed to shear, attenuating additional energy. In these cases the swivel boss being a small and relatively inexpensive part of the system is designed to be easily replaceable.

Upper handle bar clamps are provided with integral mounting provisions to allow integrating other equipment: modular information display guards, steering dampers, turn signals/auxiliary lighting, auxiliary switches, etc.

In an alternate embodiment the inboard attachment of the Integrated Hand Guard System is provided with a bar clamp. The 3D bar clamp allows the guard to be fastened to the handlebars of various geometries by employing a spherical ball joint.

DETAILED DESCRIPTION OF THE INVENTION

Figure 1:
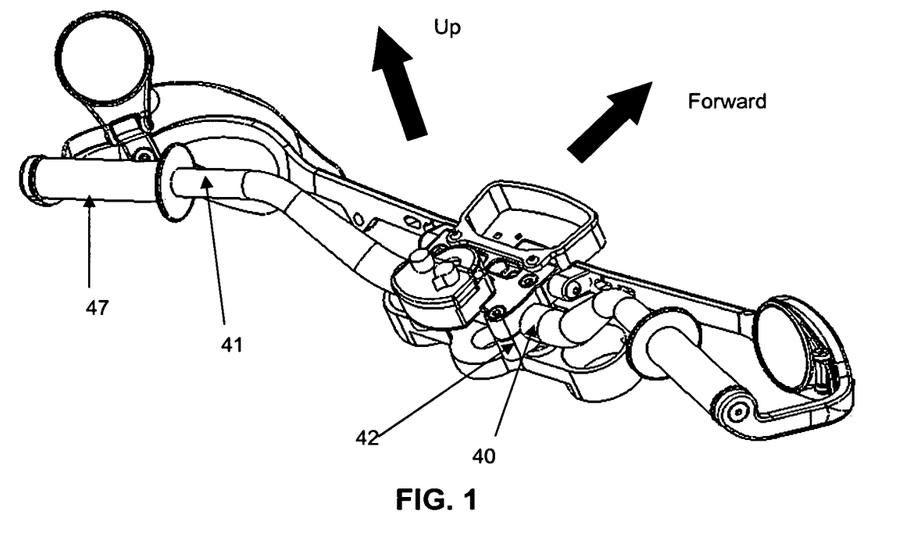
FIG. 1 is an overview of the invention shown mounted on motorcycle handlebars, looking generally forward. View depicts one mirror stowed and the other deployed. Additionally, the left hand guard depicts fairing incorporated.
Figure 2:
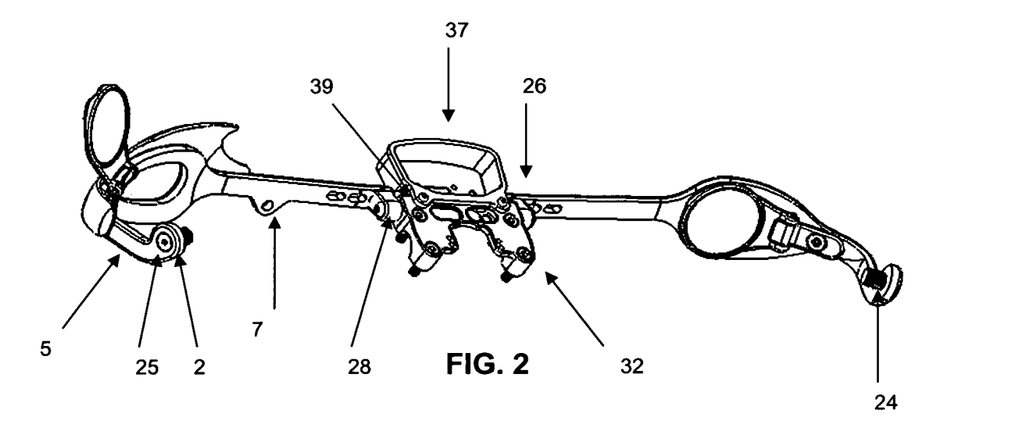
FIG. 2 shows perspective view of invention applicable to this application.
Figure 3:
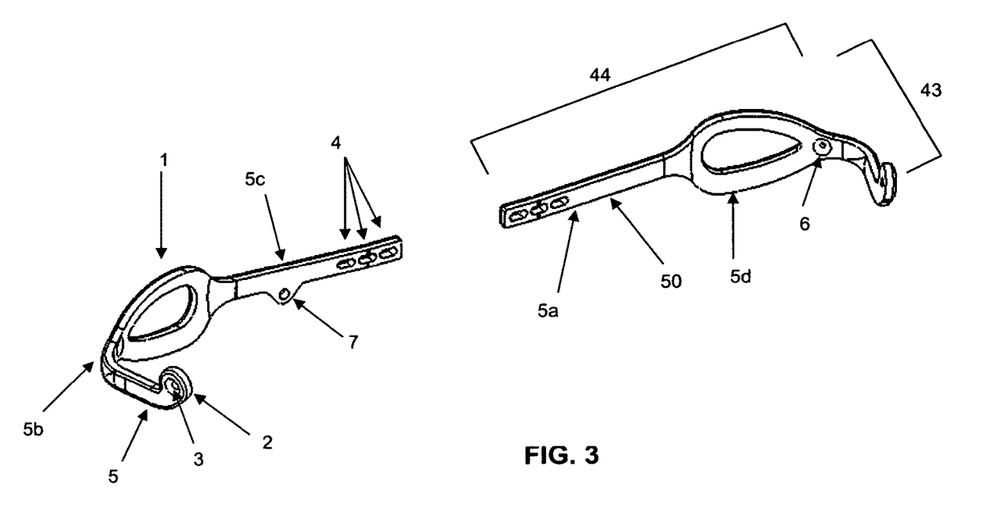
FIG. 3 is a detail of the hand/controls guard.

The system provides hand/controls protection and accessories mounting provisions for vehicle using handlebars for steering and operation control mounting. The handlebar (FIG. 1.) is essentially comprised of a middle portion (40) and two distal handgrip portions (41). The handlebar bottom clamps (42), comprising a lower portion of which is securely fastened to a vehicle steering assembly, an upper portion being sized and shaped to accept substantially half of the lower middle portion of the handlebar. A handlebar top clamp, comprising a lower portion being sized and shaped to accept substantially half of the upper middle portion of the handlebar is coupled to the bottom clamps to fix the handlebars to the steering assembly.

Figure 4:
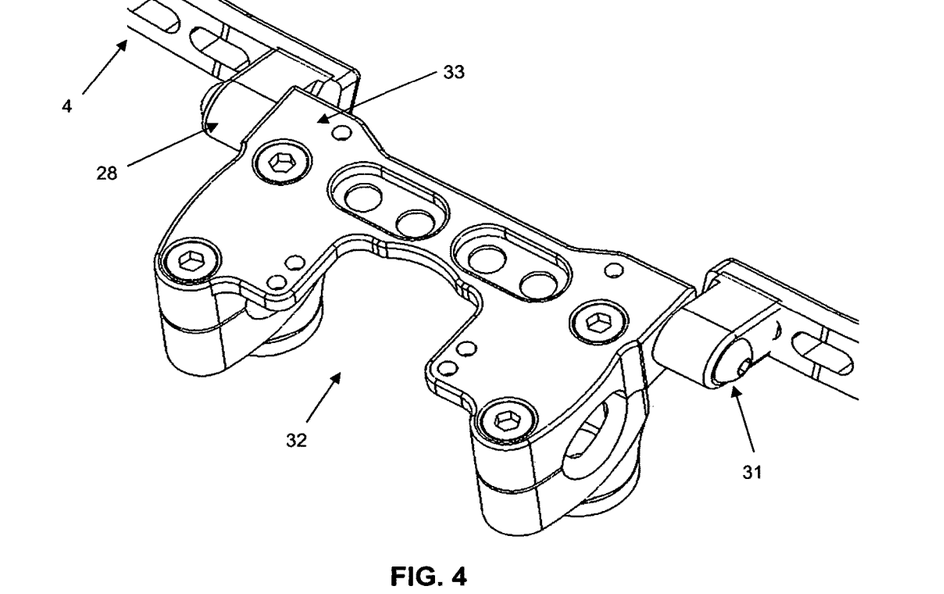
FIG. 4 is a detailed view of the inboard portion of the guard showing swivel boss and depiction of limit stop against upper bar clamp assembly.

Hand/Controls Guard (FIG. 4.) (1) is preferably manufactured from billet aluminum and formed into curved/concave final contour. The hand guard (1), is comprised a shorter portion (43) and a longer portion (44), with a nominal cross section (5a) and varying cross sections (5b) (5c) (5d), generally "L" shaped, the shorter portion (42) containing an aperture (3) on one end being rotatably attached to the distal end of the handlebar (41), the longer portion (44) varies in cross-sectional width as its length extends inwardly toward the handlebar top clamp substantially parallel to the handlebar. Guard incorporates; enlarged bar end/grip protector (2), bar end fastener aperture (3), and inboard fastener slotted apertures (4) for mounting to motorcycle upper handlebar clamps via swivel blocks (FIG. 4.) (28). The guard is offset below the enlarged bar end/grip protector to allow improved mirror deployment. Hemispherical lead-in with tapped aperture (6), preferably on the guard, provides adjustable mounting for the fully adjustable and stow able mirror assembly. Integral light boss with aperture (7) provides mounting provision for turn signals or auxiliary lighting.

Fairing (8) is preferably injection molded to nest/conform to guard contour and provides extended protection from debris and adverse weather exposure.

Figure 8:
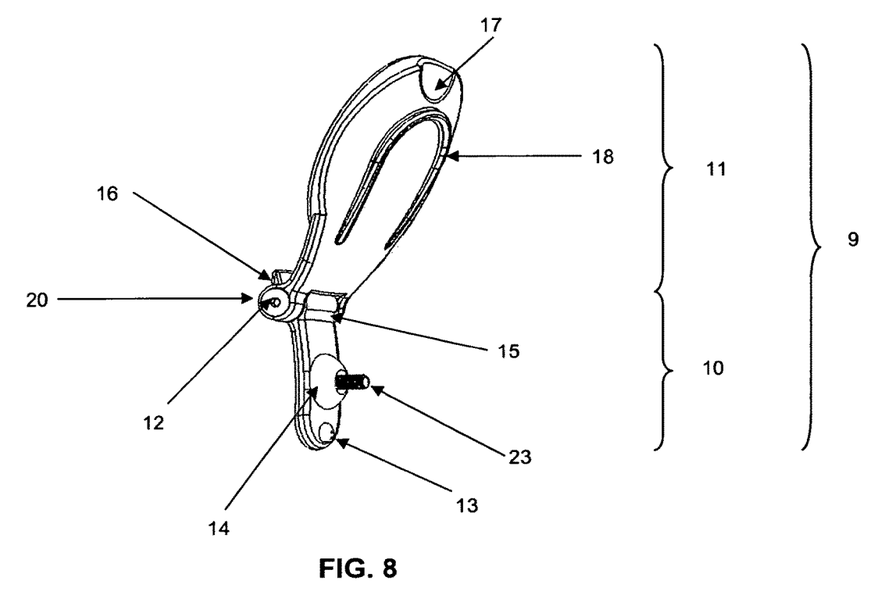
FIG. 8 shows details of the mirror assembly.

Mirror assembly (9) is, preferably, comprised of a mount base (10) hinged to the mirror base (11). Hinge pin fastener (12) acts as the mirror assembly hinge pin and hinge friction adjuster. The preferably injection molded mirror assembly (9) is, preferably, shaped and the thickness contoured to provide stability during operation and to securely nest within the guard when stowed. Rotation limit stop (13), hemispheric boss (14), mount base hinge half (15) and hinge limit stop (16) are integrated in the, preferably, injection molded mount base (10). Spherical sector shaped finger pull (17), nesting lock bead (18), mirror pocket (19) and mirror base hinge half (20) are integrated in the, preferably, injection molded mirror base (11). Optical element (21) is bonded into the mirror pocket (19). Entire assembly is typically mounted to the guard or fairing using hemispherical washer (22) and threaded fastener (23).

Figure 5:
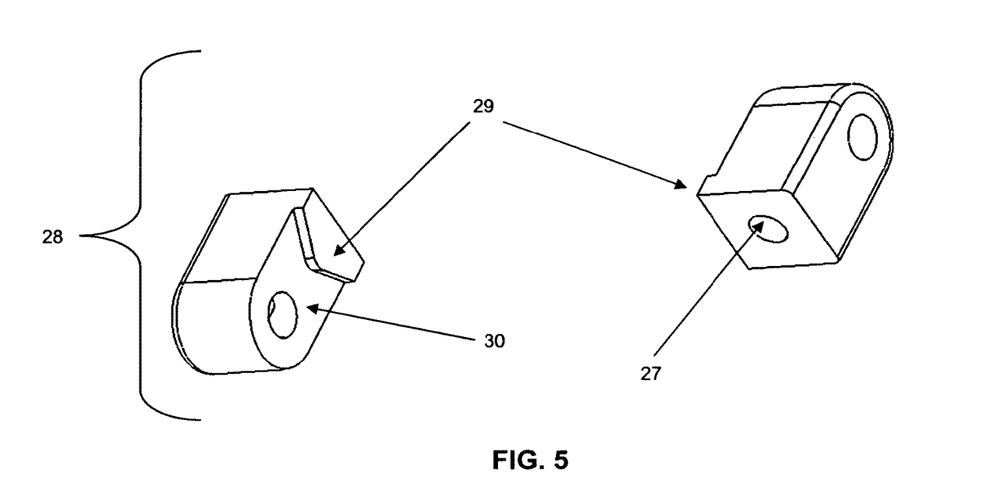
FIG. 5 shows details of the swivel boss.
Figure 6:
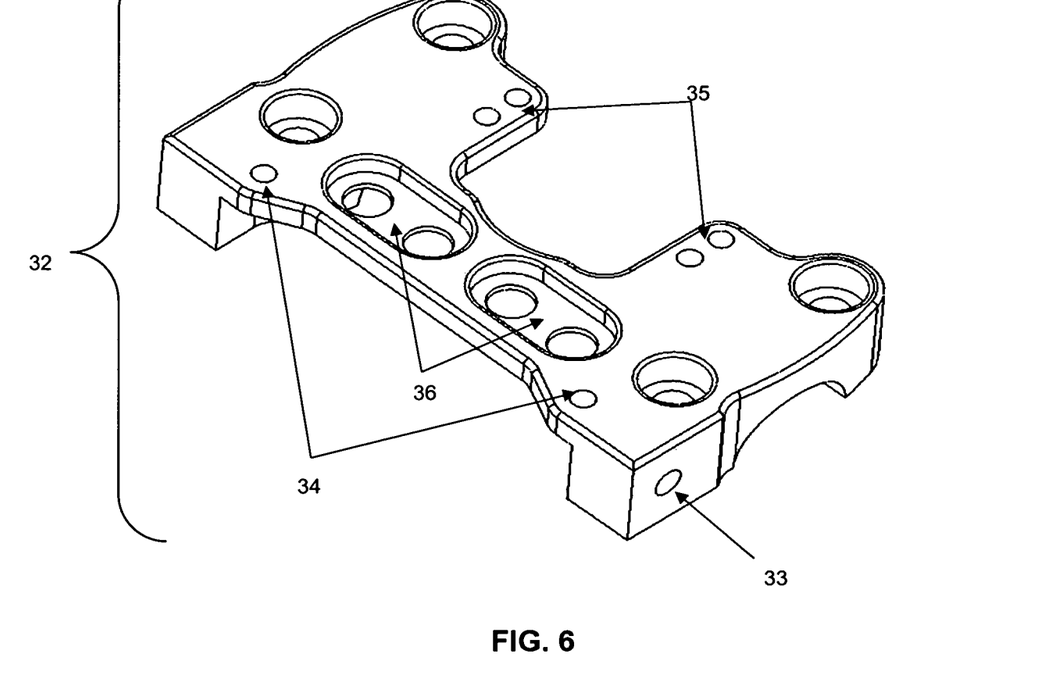
FIG. 6 shows details of the upper bar clamps and modular display mount guards.
Figure 7:
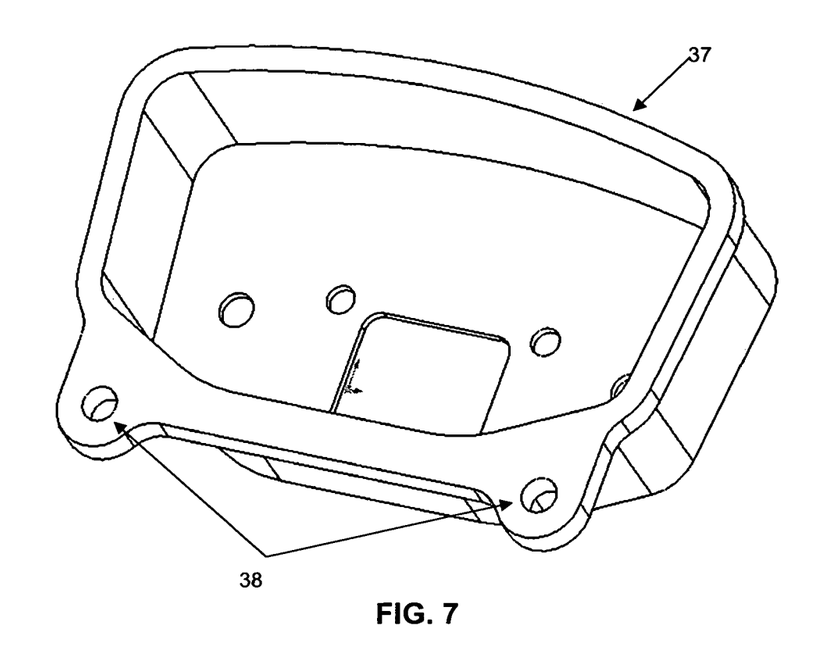
FIG. 7 shows details of a typical modular display guard.

Guard/handlebar attachment at each bar end preferably uses a threaded insert (24) in the handle bar end aperture. Fastener (25) passes through aperture in hand guard end and is threaded into the insert (24). Installation requires grip ends (by others) to be trimmed. The inboard attachment of the hand/control guard to the handlebar preferably uses fastener (26) through applicable guard fastener slotted aperture (4) into a threaded aperture (27) in the swivel boss (28). The swivel boss (28) incorporates rotation limit stops (29) and fastener through aperture (30). Swivel boss (28) preferably attaches, using fastener (31), to the side of the upper handlebar clamp (32) with an integral threaded aperture (33). Upper handlebar clamp (32) provides basic handlebar clamping and attachment to motorcycle steering assembly. Upper handlebar clamp assembly incorporates integral: modular information display guard mounting (34), steering damper mount (35) and auxiliary switch/indicator (36) mounting provisions, or various combinations of the accessory mount provisions. Typical modular information display guard (37) with common mounting boss with apertures (38), which allows attachment of various models of displays to the upper handlebar clamp using, threaded fasteners (39).

The system in all its variations, once installed, is a passive protective device. The hand guards are constructed with varied cross sections and compound bending that provide increased protective coverage over conventional bar stock devices, while minimizing weight impact. The multiple slotted apertures allow convenient, tailored fit of the guards to handlebars of various stock or modified widths. Guard installation using swivel blocks allows the operator to adjust hand guard concentric to the long axis of the handlebars to preference. Friction at the swivel block mate to the stop boss of the upper handlebar clamp assembly provides limited energy attenuation in event of minor impact. Additionally, the swivel boss incorporates positive stops to resist over rotation.

Figure 9:
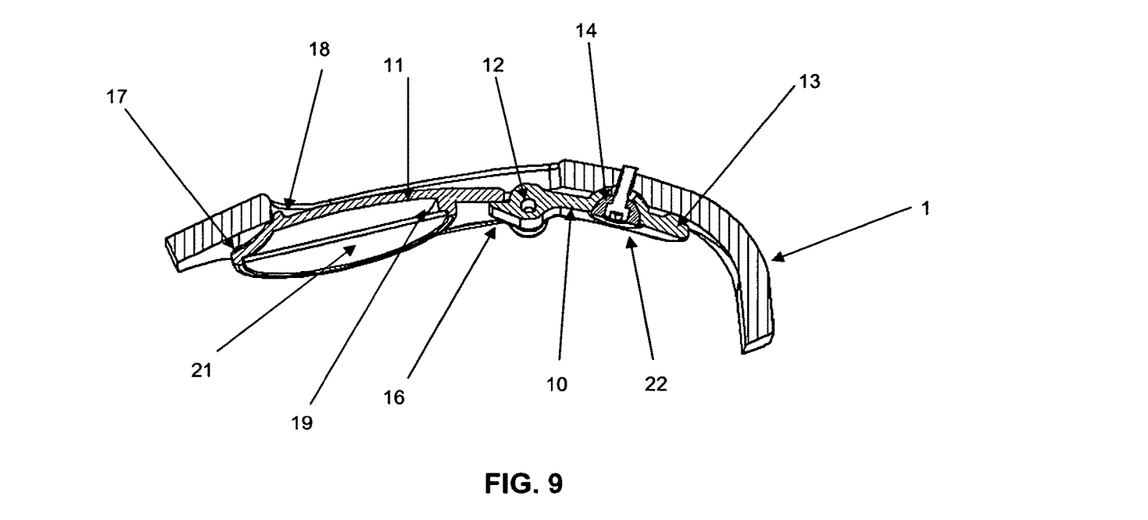
FIG. 9 is a cross section detailing the mirror assembly in the stowed position.

The mirror assembly (9) mounted to the hand guard by means of a hemispherical pocket in the hand guard (6), a hemispherical boss integral to the mirror mount base (14) and a hemispherical washer (22) all concentrically fastened together to allow three rotational degrees of freedom. The rear view mirror assembly can be rotated between the stowed and deployed positions. The rotation limit stop and hinge stop (16) work in concert to prevent mirror assembly motion toward controls due to aerodynamic loads. The rotation limit stop, hinge stop and locking bead (18) all work in concert to securely nest the mirror assembly to the hand guard against inertial loads. A finger pull in the mirror base facilitates deployment from the stowed position, which requires elastic deformation of the mirror assembly to overcome the rotation stop/nesting bead fit. The mirror assembly significantly improves reflective image line of sight through deployed location at or beyond the handlebar end. When deployed the viewing direction is fully adjustable by the operator rotating mirror hemispheric boss and mirror hinge. The mirror assembly significantly improves reflective image in high vibration environment through three-dimensional shaping to provide stiffness.

Figure 10:
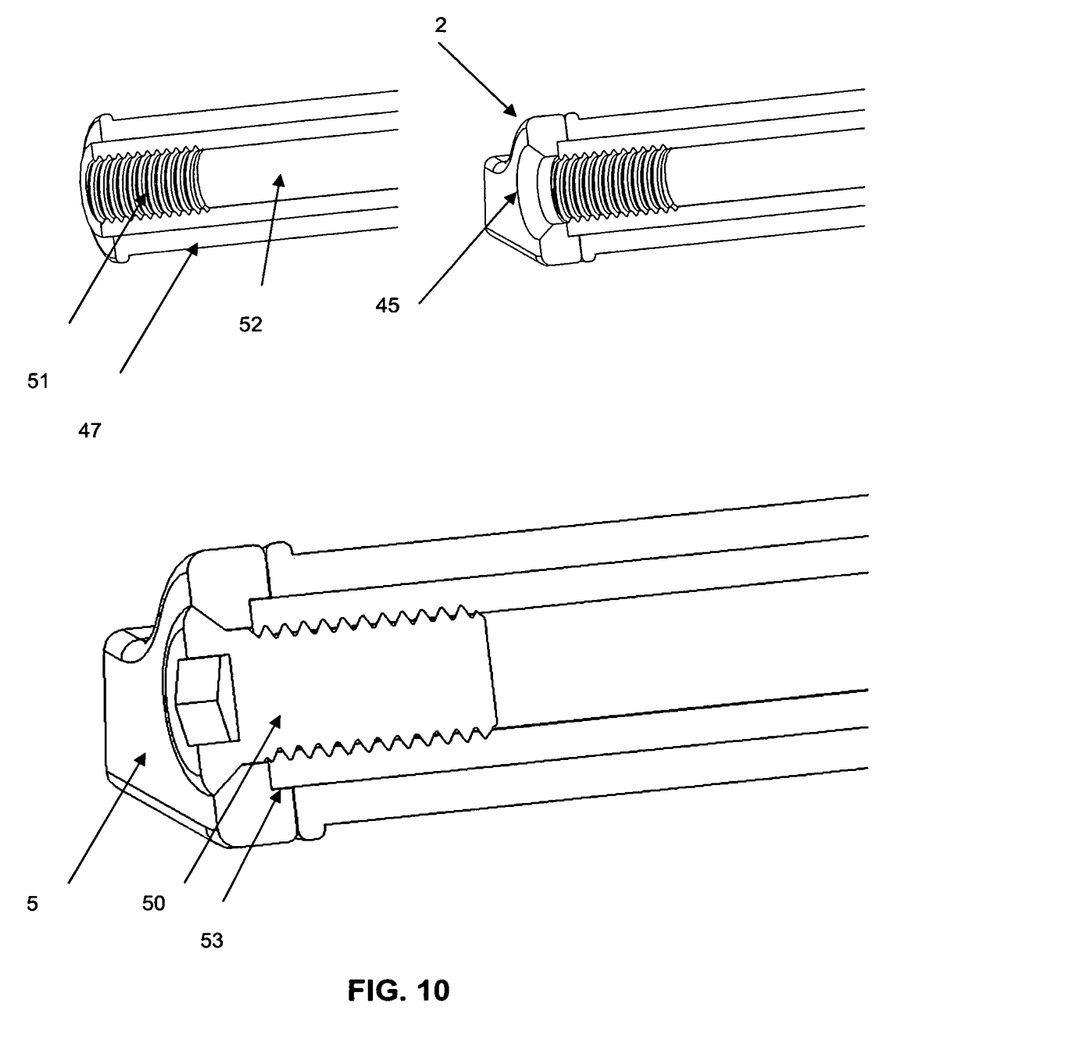
FIG. 10 shows cross sections of the handlebar modified with internal threads, handlebar grip, handguard and fastener

The handlebars are modified with internal threads (51) of the internal diameter of the handlebar (52) and can be fastened directly with a large fastener (50) by virtue of the large bar end boss (2) that is at least as large as the out side diameter of the grip (47) for protection of the grip and throttle tube. The handguard (5) can also incorporate a pocket (53) to engage the end of the handlebar.

Figure 11:
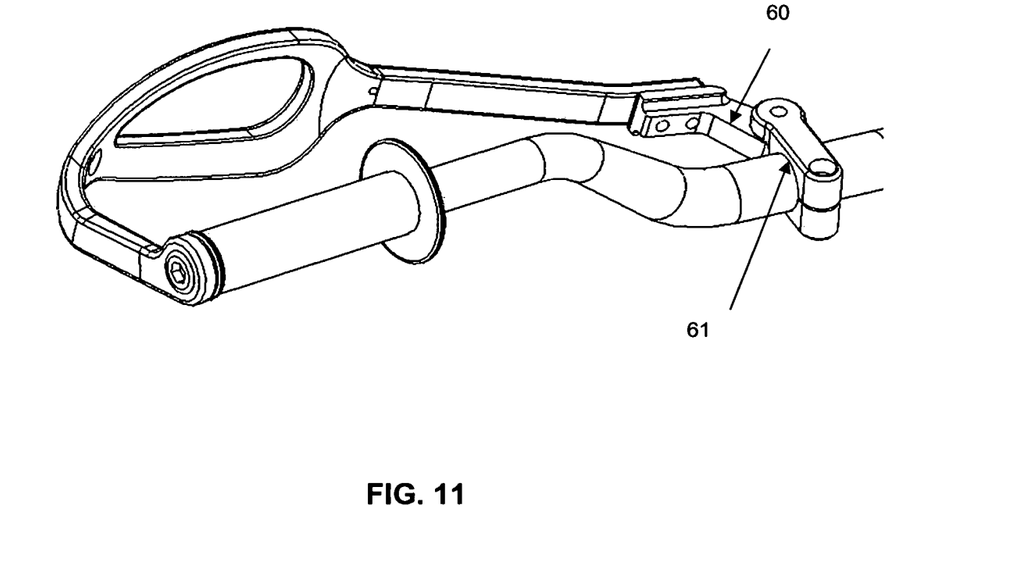
FIG. 11 shows handguard assembly with handlebar clamp.
Figure 12:
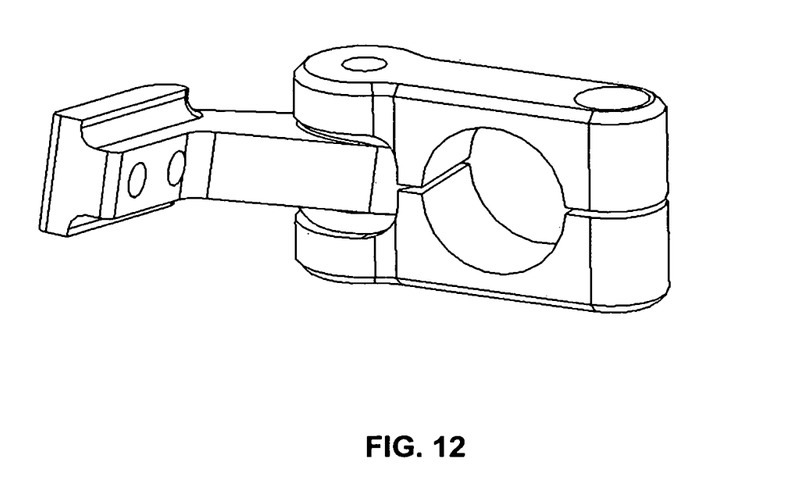
FIG. 12 shows handlebar clamp assembly.
Figure 13:
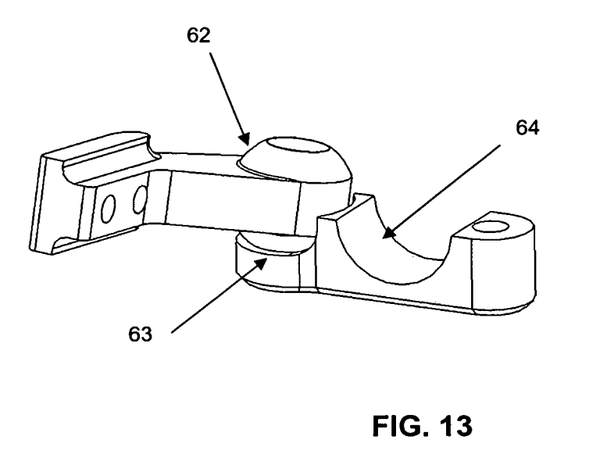
FIG. 13 shows handguard mount and lower handlebar clamp.
Figure 14:
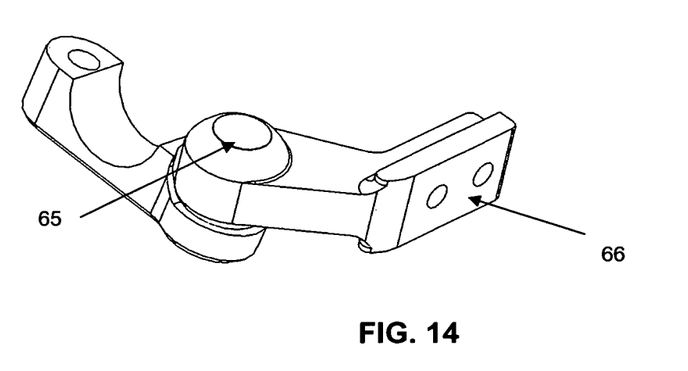
FIG. 14 shows handguard mount and lower handlebar clamp.

In an alternate embodiment the inboard attachment of the Integrated Hand Guard System is provided with a bar clamp (FIGS. 11 & 12). The 3D bar clamp allows the guard to be fastened to the handlebars of various geometries by employing a spherical ball joint. The 3D bar clamp contains an upper and lower handlebar clamp (61) made to clamp to the handlebar with a cut out surface (64) and fasteners (not shown) forward of the handlebars the handlebar clamp incorporates a spherical pocket (63). A guard clamp (60) contains a forward surface (66) that attaches to the handguard and a spherical ball portion (62) that mates concentrically with the spherical pocket portion of the bar clamp (63) that when fastened together fix both the guard and clamps to the handlebars with a greater degree of adjustability.

While the invention has been described with reference to preferred embodiments, those skilled in the art will understand that various changes may be made and equivalents may be substituted for elements thereof without departing from the scope of the invention. It is intended that the invention not be limited to the particular embodiment disclosed as the best mode contemplated for carrying out this invention, but that the invention will include embodiments falling within the scope of the claims.

What is claimed:

1. An integrated hand and controls system comprising:
a handlebar, comprising a cylindrical middle portion defining an axis and two distal handgrip portions, the distal ends diverge from the middle portion axis in a generally rearward direction, the handlebar is tubular and modified to contain concentric internal threads in the internal diameter of the distal ends; and
a handlebar grip concentrically mounted on the handlebar adjacent to the distal end of the handlebar: and
a formed aluminum handguard, comprising a shorter portion and a longer portion, generally "L" shaped, with a nominal cross-section, the shorter portion extending forward of the handlebar, containing an aperture on one end being rotatably attached to the distal end of the handlebar, the shorter portion contains an area substantially larger than the handlebar, substantially large to protect the end of the handlebar grip, the longer portion extending inwardly toward the middle portion of said handlebar substantially in front of and parallel to the handlebar sufficient to protect the riders hands and controls, the end of the longer portion containing an aperture, a fastener, sized to mate with the internal threads of the modified handlebar when inserted into the internal threads of the distal end of the handlebar, fixes the aluminum handguard to the handlebar, a handlebar clamp assembly concentrically mounted on the handlebar adjacent to the cylindrical middle portion of the handlebar, comprising an upper portion, a lower portion and a handguard mount, the upper and lower portions when fastened together attach to the handlebar, the upper and lower portions also containing concentric spherical pockets and apertures, the handguard mount containing a spherical portion and a forward portion, the spherical portion containing an aperture when concentrically fastened to the spherical portions of the upper and lower portions allow for 3 degrees of rotational adjustment, the forward portion containing at least one aperture, attaches the longer portion of the handguard.

2. An integrated hand and controls system comprising:

a handlebar, comprising a cylindrical middle portion defining an axis and two distal handgrip portions, the distal ends diverge from the middle portion axis in a generally rearward direction, said handlebar is tubular; and a handlebar grip concentrically mounted on the handlebar adjacent to the distal end of the handlebar; and a formed aluminum hand guard, comprising a shorter portion and a longer portion, generally "L" shaped, with a nominal cross-section, the shorter portion extending forward of the said handlebar, containing an aperture on one end being rotatably attached to the distal end of the handlebar, a longer portion extends inwardly, substantially in front of and parallel to the handlebar sufficient to protect the riders hands and controls, the end containing an aperture; and a handlebar clamp assembly concentrically mounted on the handlebar adjacent to the cylindrical middle portion of the handlebar, comprising an upper portion, a lower portion and a handguard mount, the upper and lower portions when fastened together attach to the handlebar, the upper and lower portions also containing concentric spherical pockets and apertures, the handguard mount containing a spherical portion and a forward portion, the spherical portion containing an aperture when concentrically fastened to the spherical portions of the upper and lower portions allow for 3 degrees of rotational adjustment, the forward portion containing at least one aperture, attaches the longer portion of the handguard.

3. The integrated hand and controls system of claim 2, wherein the aluminum hand guard contains one or more areas of greater cross-section over nominal generally forward of the handlebar grip.

4. The integrated hand and controls system of claim 2, wherein the aluminum hand guard contains an aperture configured to mount a mirror, the mirror comprising an end configured to receive an optical element and an opposite end containing an aperture, the aperture configured to attach the mirror to the hand guard which when mounted to the hand guard rotates from a position behind the hand guard for protection to a position beyond the aluminum hand guard and the handlebar for deployment.

5. The integrated hand and controls system of claim 2, wherein the shorter portion of the aluminum hand guard contains a drop down offset to the diameter concentric to and substantially larger than the handlebar, substantially large to protect the end of the handlebar grip, wherein the nominal cross section of the shorter portion is substantially smaller than the concentric diameter and extends forward substantially below the centerline of the handlebar.

\* \* \* \* \*